(12) United States Patent
Puetz et al.

(10) Patent No.: US 6,418,262 B1
(45) Date of Patent: Jul. 9, 2002

(54) FIBER DISTRIBUTION FRAME WITH FIBER TERMINATION BLOCKS

(75) Inventors: Curtis Lee Puetz, Apple Valley; Clinton Michael Knudsen, St. Louis Park; David E. Rapp, Eden Prairie; Todd Robert Duberstein, Prior Lake, all of MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/523,901

(22) Filed: Mar. 13, 2000

(51) Int. Cl.$^7$ ............................................... G02B 6/36
(52) U.S. Cl. ........................ 385/134; 385/53; 385/135
(58) Field of Search ........................ 385/53, 134, 135, 385/147

(56) References Cited

U.S. PATENT DOCUMENTS

| | | | |
|---|---|---|---|
| 4,747,020 A | | 5/1988 | Brickley et al. ............ 361/428 |
| 4,900,123 A | * | 2/1990 | Barlow et al. ................ 385/53 |
| 5,317,663 A | | 5/1994 | Beard et al. .................. 385/70 |
| 5,363,465 A | | 11/1994 | Korkowski et al. ......... 385/135 |
| 5,402,515 A | | 3/1995 | Vidacovich et al. ........ 385/135 |
| RE34,955 E | | 5/1995 | Anton et al. .................. 385/53 |
| 5,432,875 A | | 7/1995 | Vidacovich et al. ......... 385/27 |
| 5,497,444 A | | 3/1996 | Wheeler ...................... 385/135 |
| 5,701,380 A | * | 12/1997 | Larson et al. ............... 385/134 |
| 5,717,810 A | | 2/1998 | Wheeler ...................... 385/135 |
| 5,734,776 A | | 3/1998 | Puetz ......................... 385/134 |
| 5,758,003 A | | 5/1998 | Wheeler et al. ............. 385/134 |
| 5,774,245 A | | 6/1998 | Baker ......................... 359/128 |
| 5,778,130 A | * | 7/1998 | Walters et al. .............. 385/134 |
| 5,969,294 A | | 10/1999 | Eberle et al. ................. 174/57 |
| 6,208,796 B1 | * | 3/2001 | Vigliaturo ................... 385/135 |

FOREIGN PATENT DOCUMENTS

| | | |
|---|---|---|
| EP | 0 849 602 A2 | 6/1998 |
| WO | WO 00/05611 | 2/2000 |

OTHER PUBLICATIONS

ADC Telecommunications brochure entitled "Next Generation Frame (NGF) Product Family Ordering Guide," 21 pages, dated Oct. 1998.
ADC Telecommunications brochure entitled "FL2000 Products," 48 pages, dated Nov. 1996.
ADC Telecommunications brochure entitled "Fiber Cable Management Products, Second Edition," 144 pages, dated Oct. 1995.

* cited by examiner

Primary Examiner—John D. Lee
(74) Attorney, Agent, or Firm—Merchant & Gould P.C.

(57) ABSTRACT

A fiber termination block including a frame structure adapted to be connected to a fiber distribution rack. The frame structure includes a front end and a rear end. A front fiber optic adapter array is positioned adjacent the front end of the frame structure. A plurality of rear modules are mounted at the rear end of the frame structure. Each of the rear modules defines a front opening. At least one coupler is mounted within each of the rear modules. A plurality of fiber optic cables are provided for transmitting fiber optic signals between the front fiber optic adapter array and the couplers. The fiber optic cables extend through the front openings of the rear modules to access the couplers.

23 Claims, 14 Drawing Sheets

FIBER DISTRIBUTION FRAME WITH FIBER TERMINATION BLOCKS

FIELD OF THE INVENTION

The present invention relates generally to telecommunications equipment. More particularly, present invention relates to high-density fiber distribution frames including fiber termination blocks.

BACKGROUND OF THE INVENTION

In the telecommunications industry, the use of fiber optic cables for carrying transmission signals is rapidly growing. To interconnect fiber optic equipment, fiber distribution frames have been developed. Examples of fiber distribution frames are shown in commonly assigned U.S. Pat. Nos. 5,497,444 and 5,758,003, which are hereby incorporated by reference.

With the increase in use of fiber optic cables in the telecommunications industry, it is desirable to provide fiber distribution frames with increased density. By density, it is meant the number of locations per unit volume or unit area for providing connection on the fiber distribution frame.

The space constraints associated with high-density distribution frames can cause cable management problems. Effective cable management prevents excessive bending of fiber optic cables within the frames. Effective cable management also minimizes tangling of cables, and provides improved accessibility to components that may require servicing.

It is an object of the present invention to provide a fiber distribution frame that permits high density, ready access and enhanced fiber management.

SUMMARY OF THE INVENTION

One aspect of the present invention relates to a fiber termination block that includes a frame structure adapted to be connected to a fiber distribution rack. The frame structure includes a front end and a rear end. A front fiber optic adapter array is positioned adjacent the front end of the frame structure. A plurality of rear modules is mounted at the rear end of the frame structure. Each of the rear modules defines a front opening. At least one coupler is mounted within each of the rear modules. A plurality of fiber optic cables is provided for transmitting fiber optic signals between the front fiber optic adapter array and the couplers. The fiber optic cables extend through the front openings of the rear modules to access the couplers.

Another aspect of the present invention relates to a fiber optic module that is adapted to be connected to a fiber optic distribution frame. The fiber optic module includes a housing having two spaced-apart major sides interconnected by two spaced-apart minor sides. The major and minor sides extend between front and rear ends of the housing. The front end of the housing defines a front opening through which a plurality of fiber optic cables can pass. The module also includes structure for connecting the housing to the distribution frame, a plurality of fiber optic adapters mounted at the rear end of the housing, and a plurality if indicator lights mounted at the front end of the housing. A fiber optic coupler is mounted within the housing and at least one radius limiter is positioned near the front opening of the housing. The radius limiter limits the bending radiuses of the fiber optic cables that pass through the opening.

A further aspect of the present invention relates to a fiber distribution apparatus including a rack having a front side and a rear side. A front fiber optic adapter array is positioned adjacent the front side of the rack, and a plurality of rear modules is mounted at the rear side of the rack. Each of the rear modules defines a front opening. At least one coupler mounted within each of the rear modules, and a plurality of fiber optic cables is provided for transmitting fiber optic signals between the front fiber optic adapter array and the couplers. The fiber optic cables extend through the front openings of the rear modules to access the couplers.

A variety of advantages of the invention will be set forth in part in the description that follows, and in part will be apparent from the description, or may be learned by practicing the invention. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Figure 1:
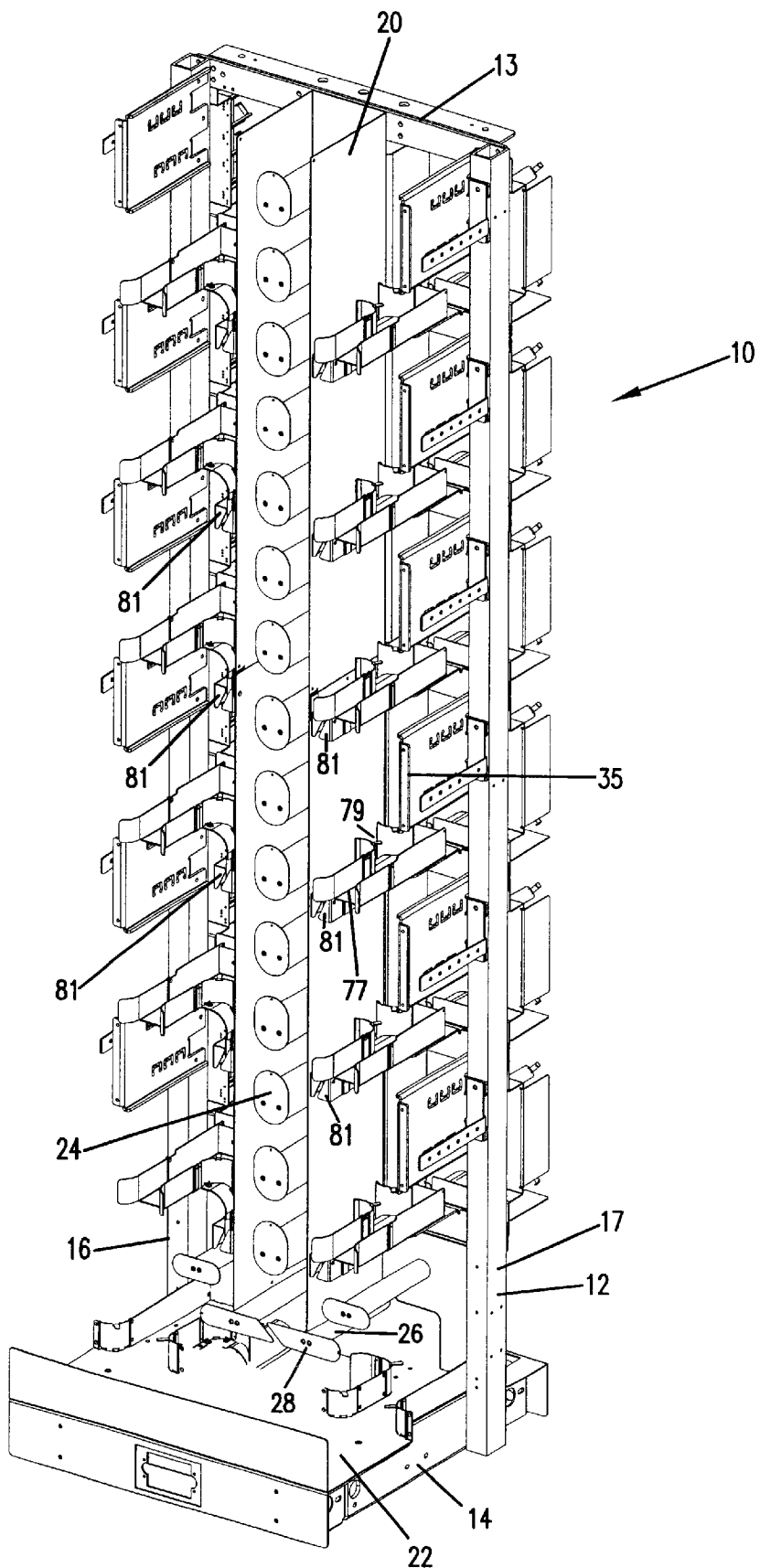
FIG. 1 is a front perspective view of a fiber distribution rack constructed in accordance with the principles of the present invention.

Reference will now be made in detail to exemplary aspects of the present invention that are illustrated in the accompanying drawings. Wherever possible, the same reference numbers will be used throughout the drawings to refer to the same or like parts. With initial reference to FIG. 1, a fiber distribution apparatus 10 (i.e., a rack, frame, bay, etc.) is shown including a support frame 12 mounted on a base member 14. The frame 12 includes spaced-apart and parallel vertical support posts 16,17 extending the height of the frame 10. The support posts 16,17 are connected at their upper ends by a cross-brace 13. On the front side of the frame 12, a vertical and centrally positioned trough 20 is provided. The trough 20 is vertically aligned and has a U-shaped cross-section that opens toward the front of the frame 12. A back wall of the trough 20 is rigidly secured to the top brace 13. The base 14 includes a base trough 22 that is positioned below and is accessible from the vertical trough 20.

Positioned within the vertical trough 20 is a plurality of spools 24. Radius limiters 26 are provided at the lower terminal end of the vertical trough 20. The radius limiters 26 are capped with clips 28 to permit passage of fiber optic cables between the spacing of the clips 28 and into the vertical trough 20 such that fibers can be passed from the base trough 22 into the vertical trough 20.

Figure 2:
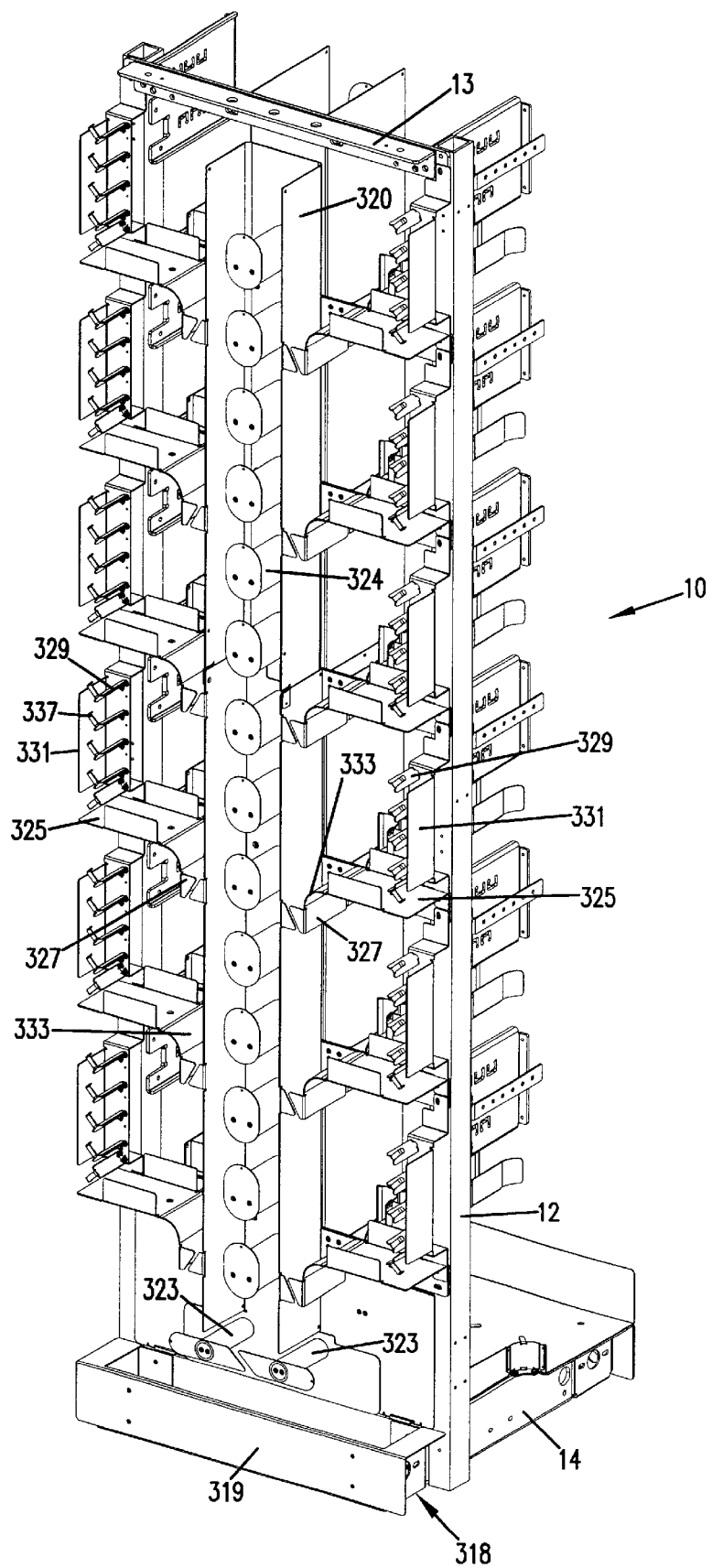
FIG. 2 is a rear perspective view of the fiber distribution rack of FIG. 1.

Referring to FIG. 2, the backside of the fiber distribution apparatus 10 also includes a centrally located, vertical trough 320. A plurality of vertically spaced-apart spools 324 is positioned within the trough 320. A rear base opening 318 is positioned beneath the vertical trough 320 for use in allowing cable to pass through the base 14 in raised floor applications. Radius limiting guides 323 are provided for guiding fiber optic cable fed to and from the vertical trough 320. A base plate 319 protects fiber optic cables routed adjacent to the bottom of the frame 14.

Still referring to FIG. 2, vertically spaced-apart horizontal troughs 325 are positioned on left and right sides of the vertical trough 320. Each of the horizontal troughs 325 is connected to a guide ring 327 by a downwardly curved radius limiter 333. The guide rings 327 are arranged to define vertical channels positioned on opposite sides of vertical trough 320. A set of five vertically spaced-apart fanning members 329 is positioned above the outer end portion of each of the horizontal troughs 325. The fanning members 329 have curved surfaces that function as bending radius limiters. The curved surface of the lowermost fanning member of each set face downwardly, while the curved surfaces of the remainder of the fanning members of each set face upwardly. A cable retaining flange 337 is located at the far end of each fanning member 329. Shielding plates 331 are positioned outside the fanning members 329.

Figure 3:
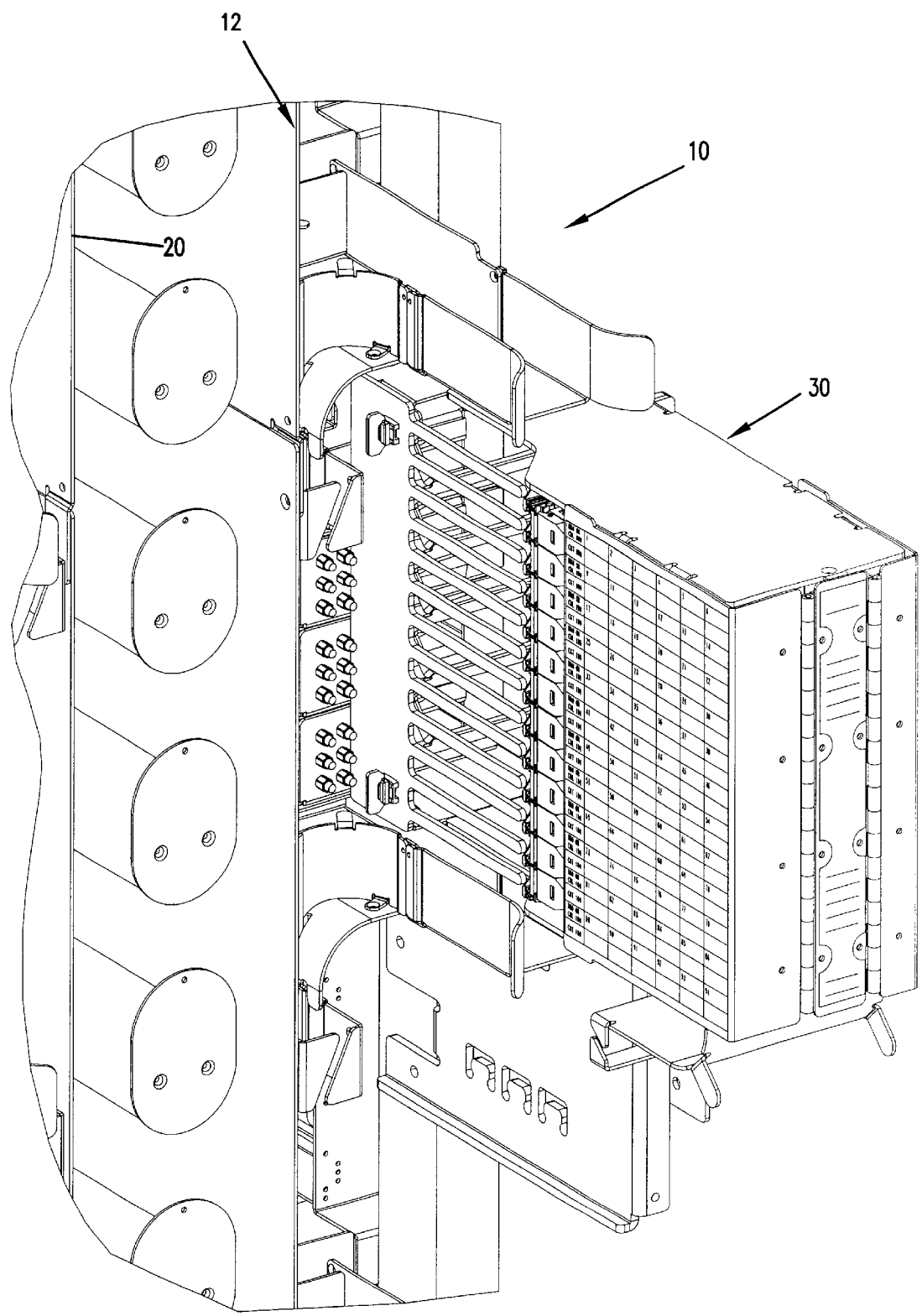
FIG. 3 is a partial front view of the fiber distribution rack of FIG. 1 with a fiber termination block secured thereto.
Figure 4:
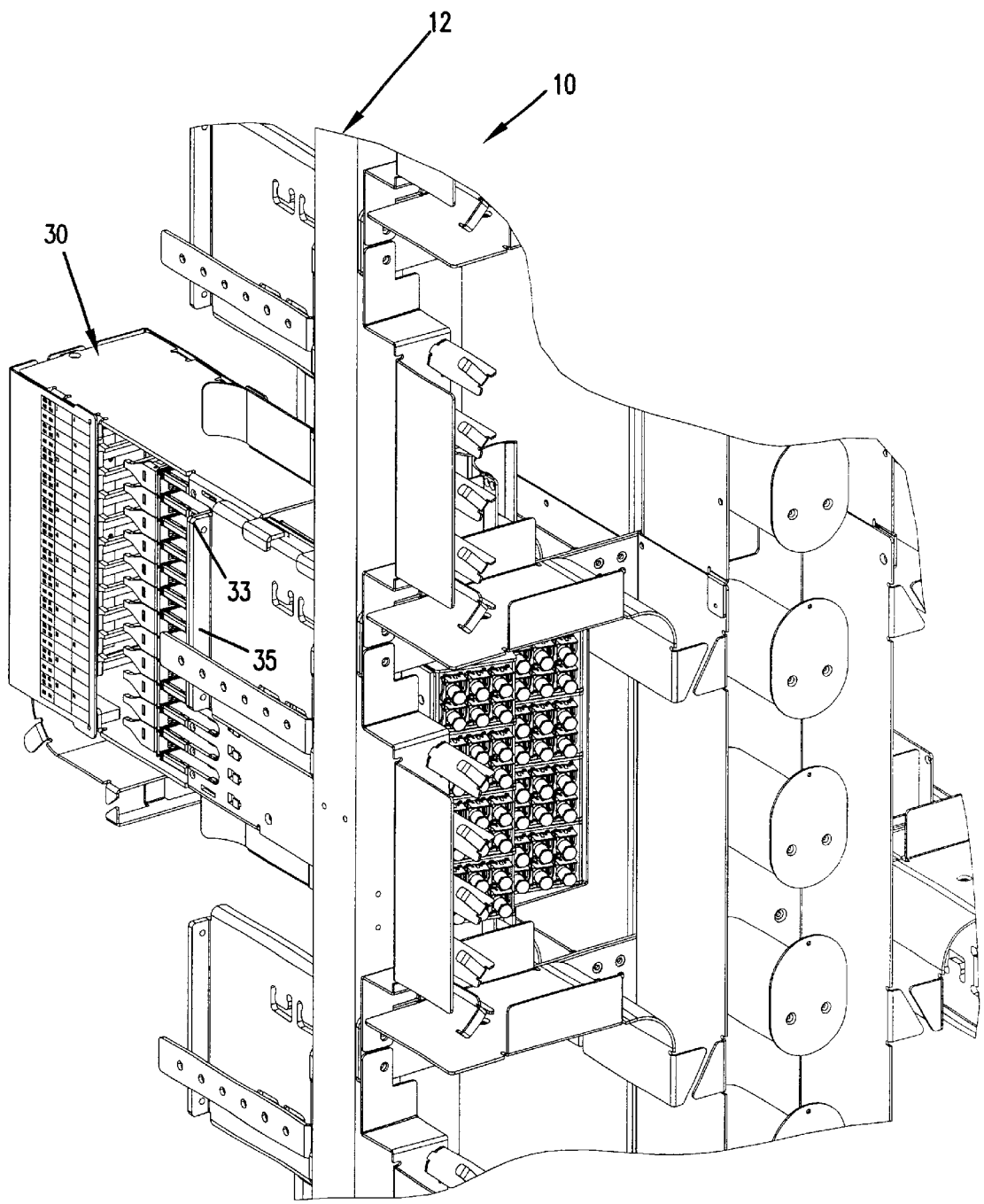
FIG. 4 is a rear perspective view of the rack and termination block of FIG. 3.
Figure 7:
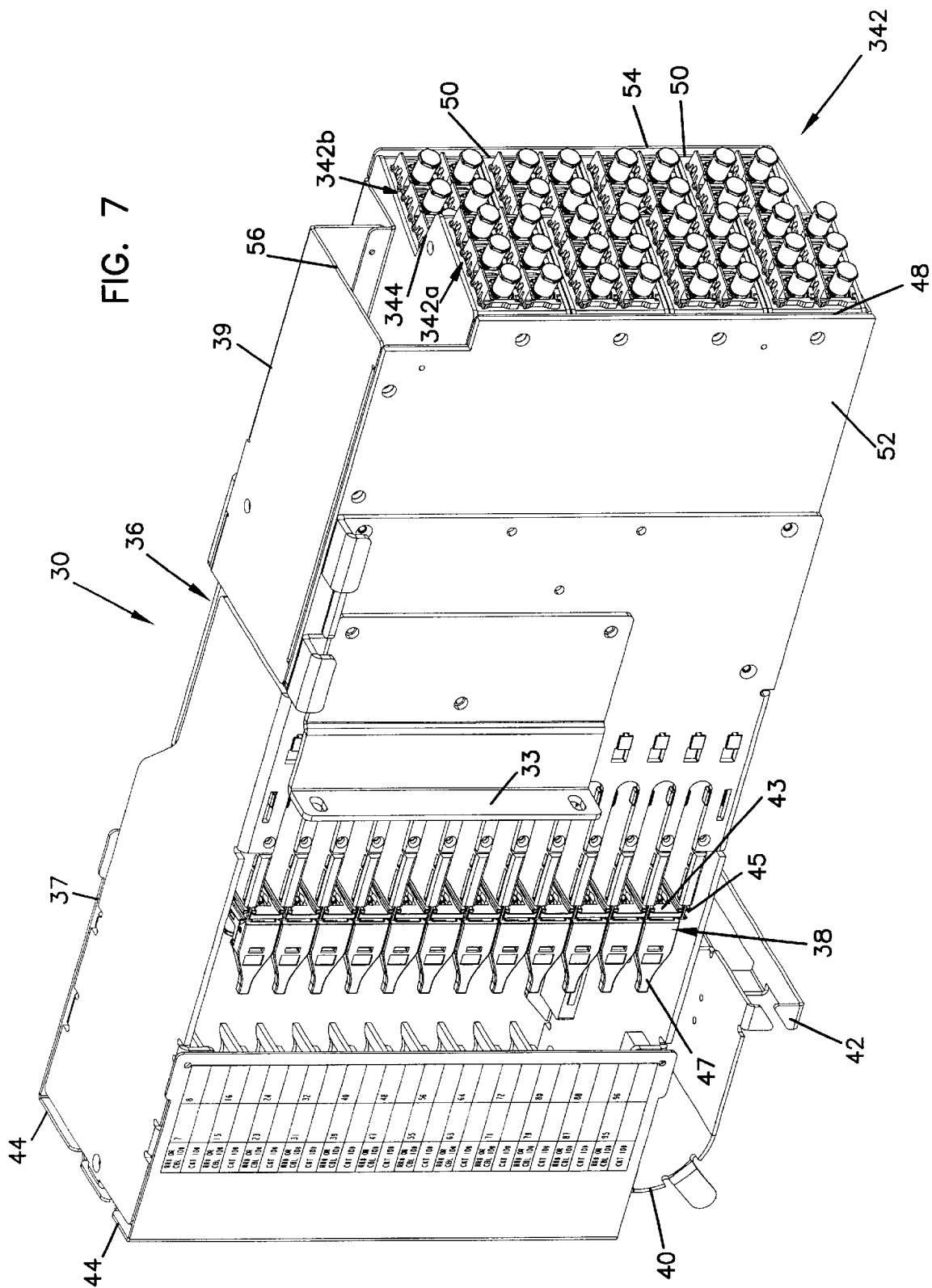
FIG. 7 is a rear perspective view of the fiber termination block of FIG. 6.

The frame 12 is configured to hold or support a plurality of fiber termination blocks. Preferably, the fiber termination blocks are mounted on the frame 12 so as to form separate vertical rows located on opposite sides of the central trough 20. FIGS. 3 and 4 show a representative fiber termination block 30 mounted on the right side of the vertical trough 20. It will be appreciated that fiber termination blocks mounted on the left side of the vertical trough preferably are constructed in the mirror image of the termination block 30. The fiber termination block 30 preferably includes a lateral flange 33 (best shown in FIGS. 4 and 7) positioned to align with a corresponding flange 35 (best shown in FIGS. 1 and 4) of the frame 12. To secure the termination block 30 to the frame 12, fasteners (e.g., screws, bolts, etc.) are used to connected the two flanges 33, 35 together. However, it will be appreciated that any type of connection arrangement could be used.

Figure 5:
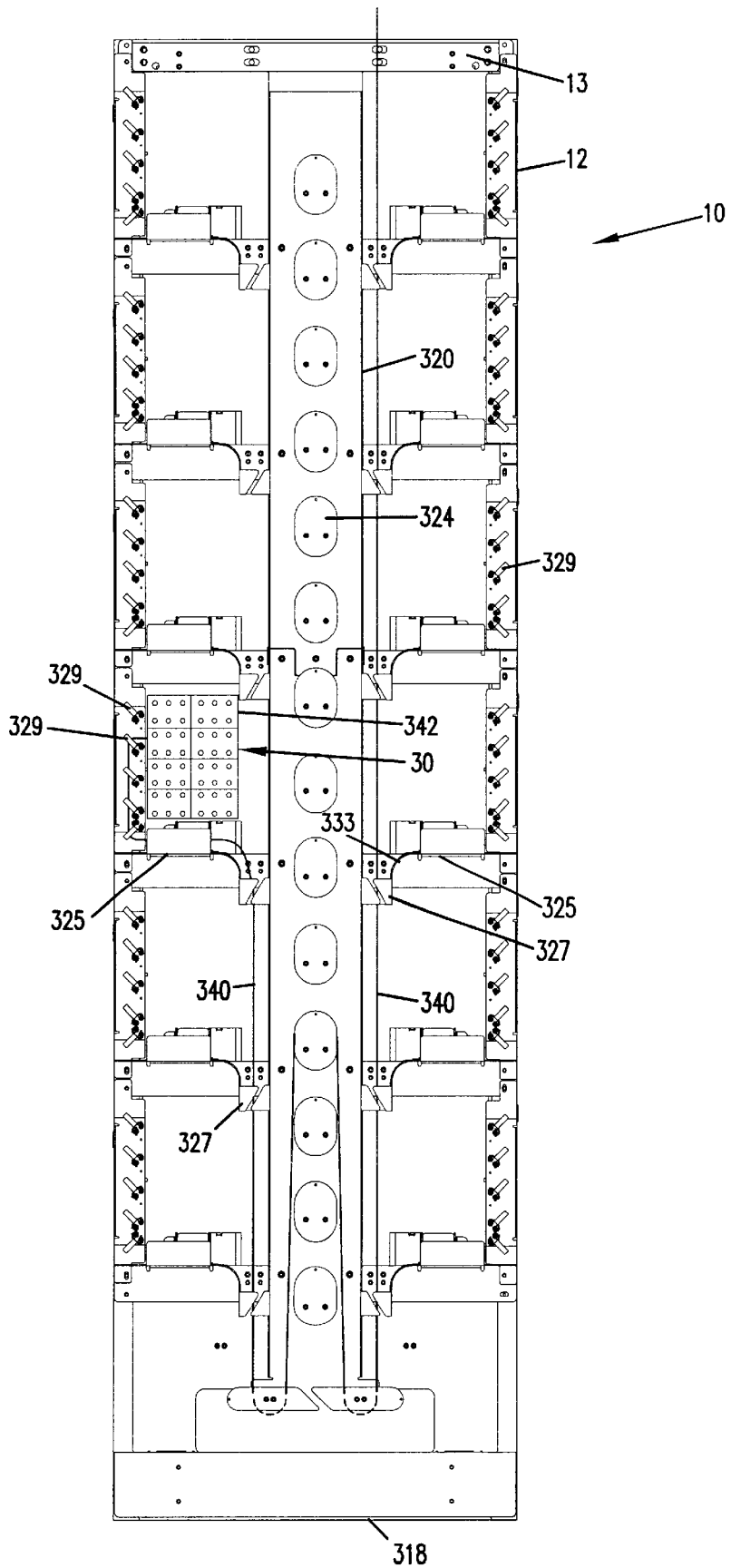
FIG. 5 is a rear view of the rack of FIGS. 1 and 2 with a cable management route schematically depicted.
Figure 6:
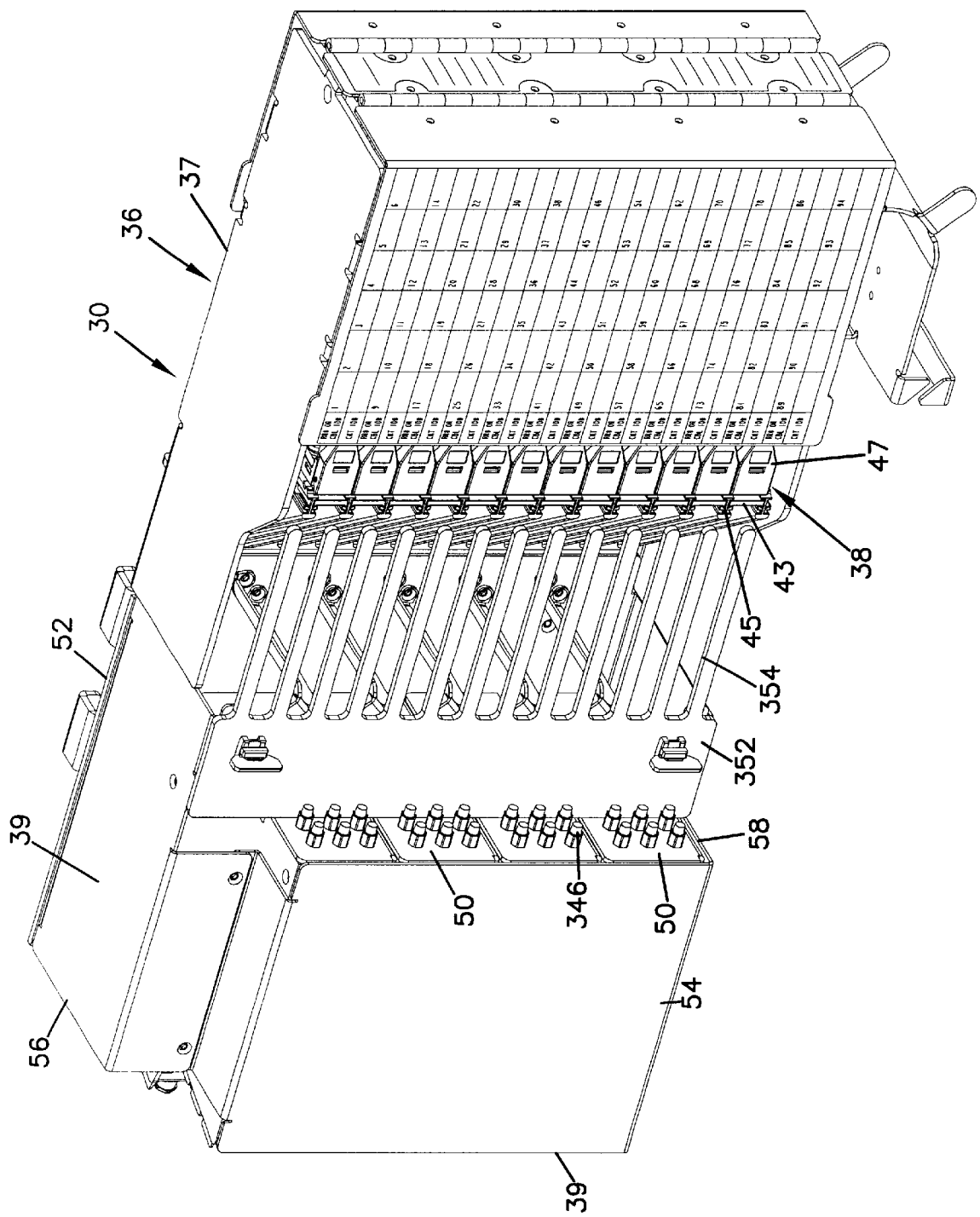
FIG. 6 is a perspective view of a fiber termination block constructed in accordance with the principles of the present invention.

FIG. 5 shows a rear view of the fiber distribution apparatus 10 with the fiber termination block 30 mounted on the frame 12. A representative fiber optic cable 340 is shown connected to a rear adapter array 342 of the termination block 30. As shown in FIG. 5, the cable 340 is guided by numerous cable management structures. For example, the cable 340 extends between two of the fanning members 329 downward to the horizontal trough 325. The cable 340 then extends across the trough 325, and down the channel defined by rings 327 toward the bottom of the frame 12. Excess cable is managed by looping the excess cable about the spools 324 in the rear vertical channel 320. From the vertical channel 320, the cable can extend under radius limiter 323 and upward through rings 327 to the top of the frame 12 for overhead cable entry/exit.

Figure 8:
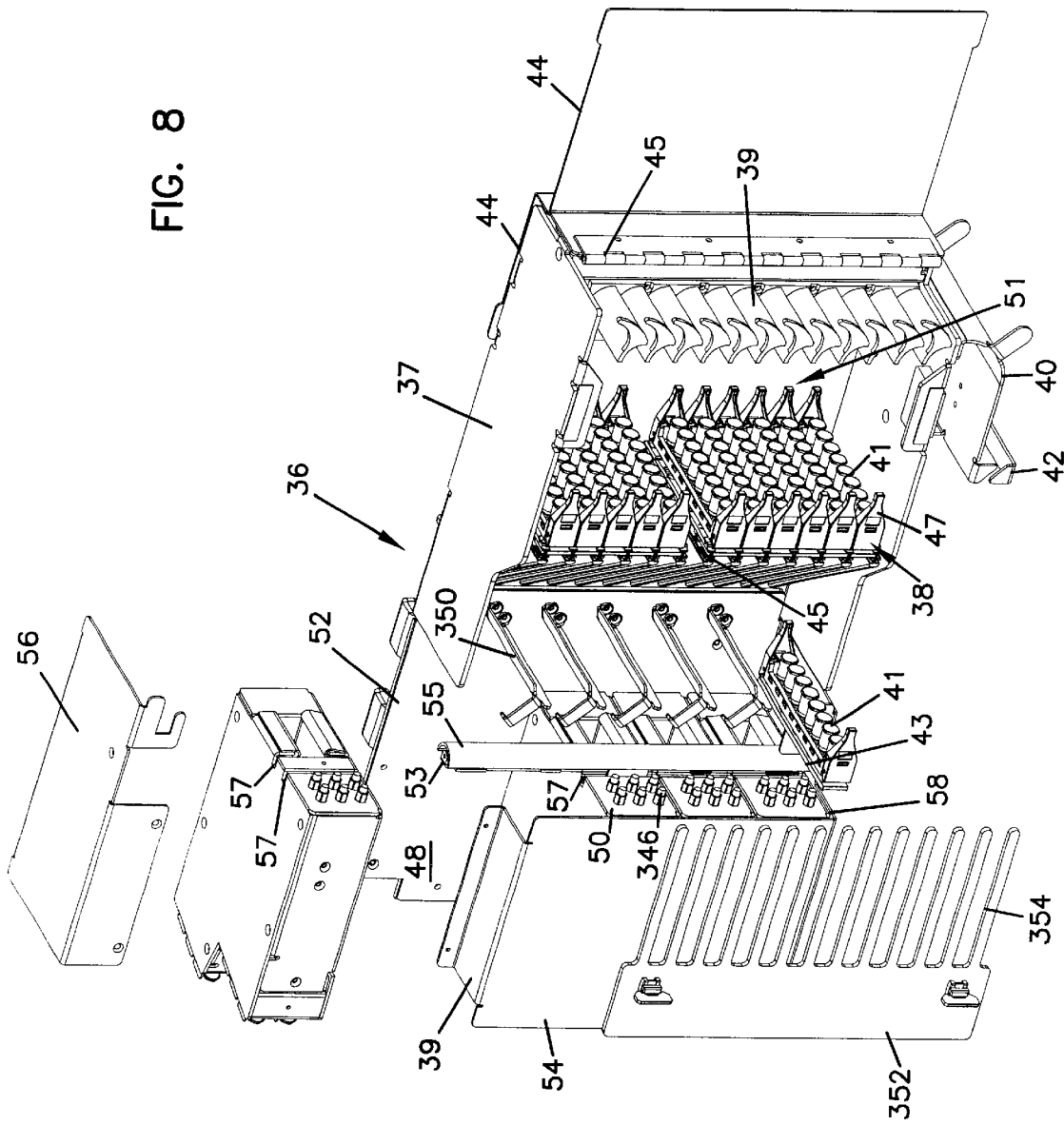
FIG. 8 is a partially exploded, perspective view of the fiber termination block of FIG. 6.
Figure 9:
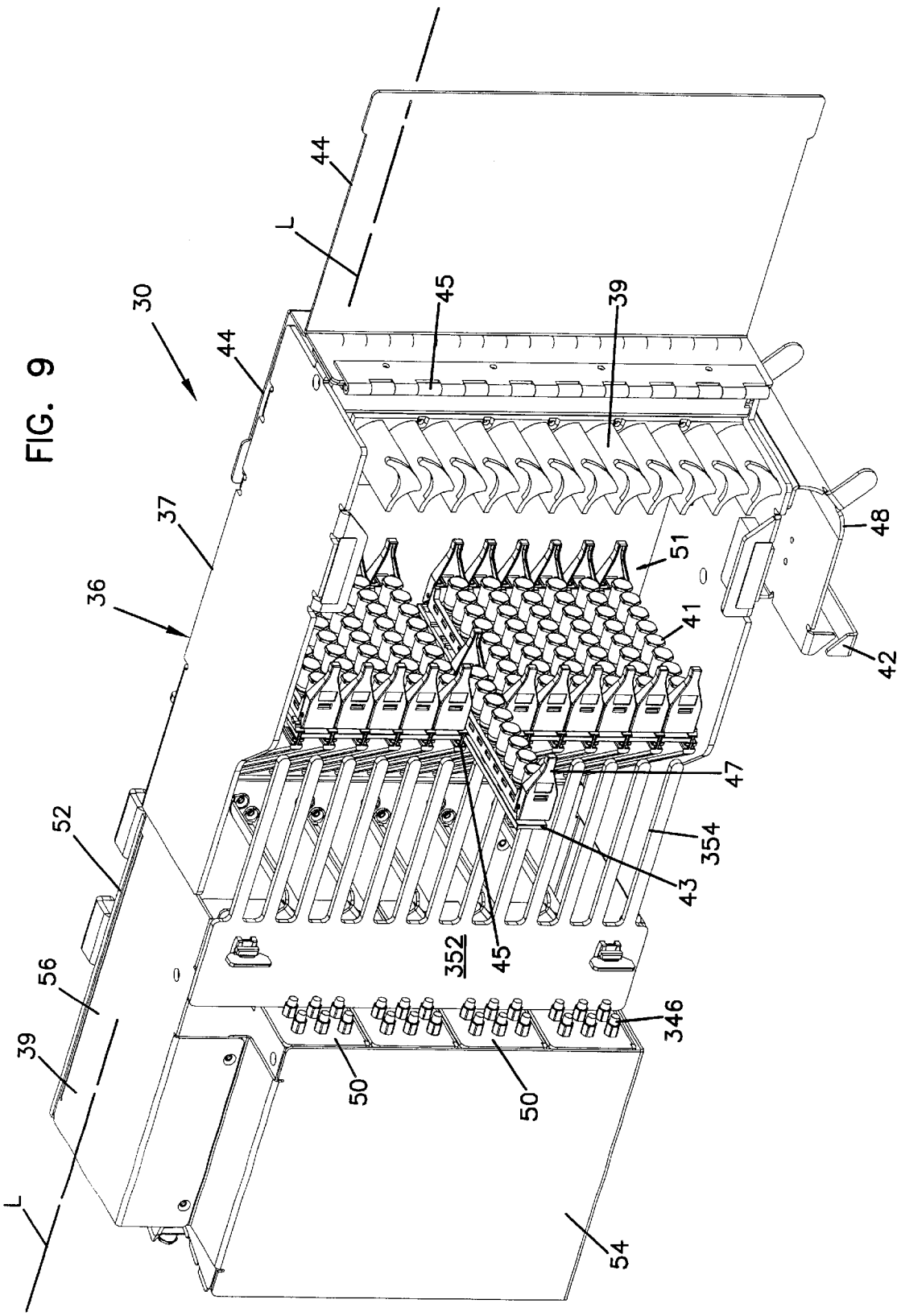
FIG. 9 is a perspective view of the fiber termination block of FIG. 6 with the front door open and one of the sliding adapter packs slid laterally outward.

FIGS. 6–10 show the fiber termination block 30 in isolation from the frame 12. The termination block 30 includes a support frame 36 that defines a front housing 37 and a rear housing 39. A plurality of front adapter modules 38 (i.e., sliding adapter packs) are mounted within the front housing 37. Each of the front adapter modules 38 includes a row of fiber optic adapters 41 mounted on an elongated support structure 43. The rows of adapters 41 form a front adapter array 51 (best shown in FIGS. 8 and 9) that includes a plurality of rows and columns of adapters. The support structures 43 are mounted within guides 45 connected to the frame 36. The guides 45 allow the front adapter modules 38 to individually slide in a direction transverse relative to a longitudinal axis L of the termination block 30 (e.g., horizontally as shown in FIG. 9). This individual sliding action makes the adapters 41 more accessible. Pivoting locks 47 prevent the adapter modules 38 from inadvertently sliding. Further details concerning the adapter modules 38 are provided in the aforementioned '444 patent, which was previously incorporated by reference.

The fiber optic adapters 41 permit the connection of fiber optic cables to the front sides of the modules 38. The adapters 41 also provide locations for connecting fiber optic cables to the rear of each module 38. Fiber optic cables connected to the front of the modules 38 will extend away from the front faces of the modules 38 in a direction generally perpendicular to a plane defined by posts 16,17. To direct such fiber optic cables rearwardly, the cables first extend between fanning members 39, and then extend downwardly around a radius limiter 40 and rearwardly through a lower retaining clip 42. The cables then extend rearwardly through a horizontal trough 77 provided on the distribution apparatus 10 (shown in FIG. 1), and laterally through passage 79 toward the center of the rack. After passing through passage 79, the cables extend downwardly through vertically spaced-apart rings 81. If it is desired to provide cross-connections with circuits at the opposite side of the frame 12, the cables are looped under radius limiters 26, routed to the other side of the frame, and extended up through rings 81 to the desired cross-connect location. Excess cable can be managed by wrapping the cable around the spools 24 of the vertical trough 20 in the same manner shown in FIG. 5. If it is desired to provide cross-connections with another distribution apparatus, the cables preferably exit the distribution apparatus through trough 22.

To protect the looped fiber optic cables at the front of each fiber termination block 30, hinged doors or covers 44 are secured to the frame 36 such that the covers 44 protect the looped cables extending from modules 38 and around radius limiter 40. The doors 44 may be opened by pivoting along their vertical hinges 45 to permit increased ease of access to the adapter modules 38.

The rear housing 39 of the termination block 30 defines a cavity or bay 48 sized to receive a plurality of rear adapter modules 50. The bay 48 is generally rectangular and is defined between two spaced-apart vertical walls 52 and 54. A removable cover 56 encloses the top of the bay 48, and a base 58 defines the bottom of the bay 48.

Figure 10:
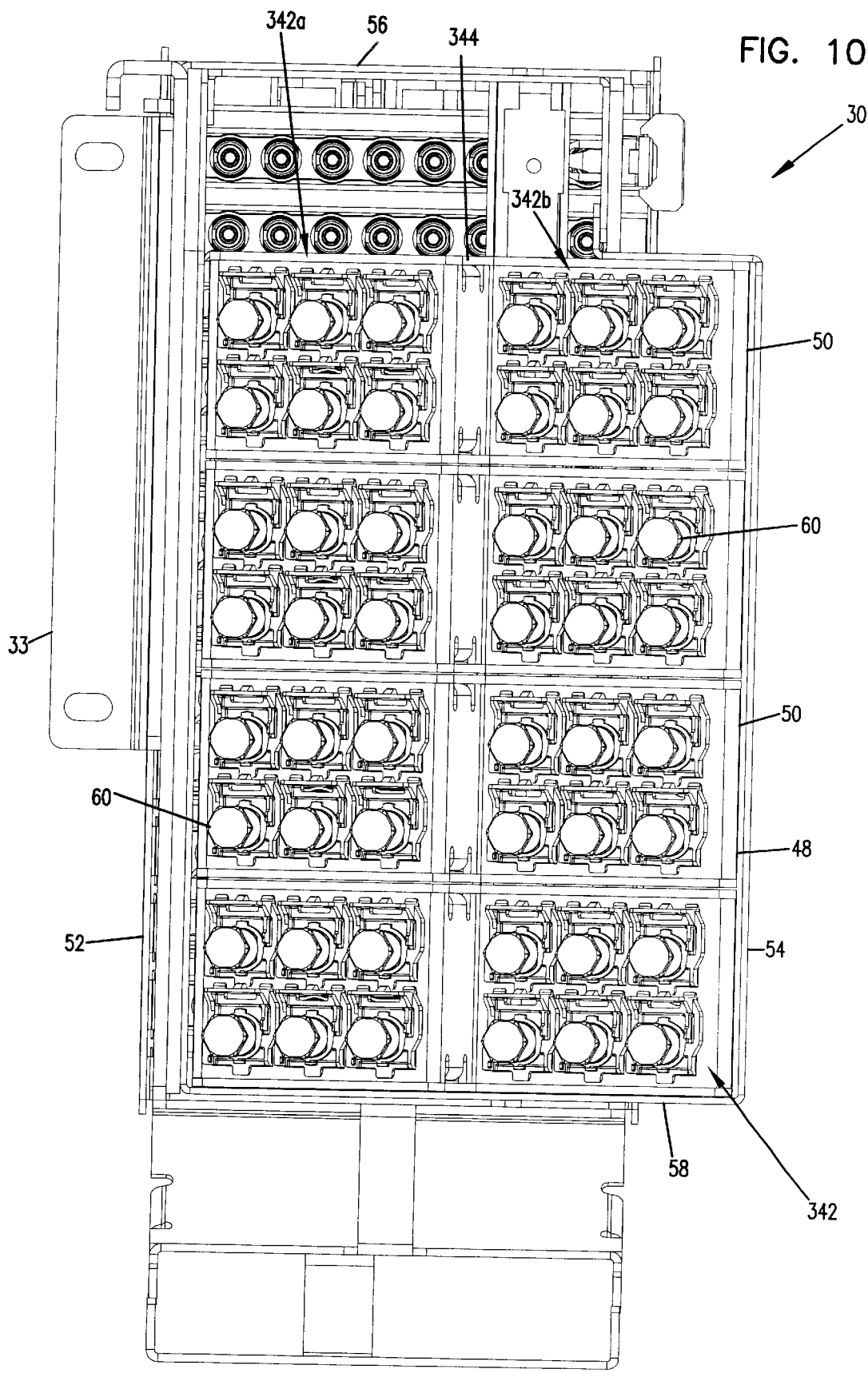
FIG. 10 is a rear view of the fiber termination block of FIG. 6.

As best shown in FIGS. 8–10, the rear adapter modules 50 are vertically stacked within the bay 48. For example, as shown in the drawings, the bay 48 is sized to receive four of the adapter modules 50. However, it will be appreciated that the number of modules can be varied without departing from the principles of the present invention. Any number of conventional techniques can retain the rear adapter modules 50 within the rear housing 39. For example, the modules can be secured to the rear housing 39 by fasteners (e.g., screws, bolts, etc.), clips, latches, etc. As shown in FIG. 8, the modules 50 are secured (e.g., by fasteners) to a vertical support 53 mounted between the base 58 and the cover 56 of the rear housing 39 (e.g., by fasteners). The front of the vertical support 53 is covered by a removable vertical edge protector 55 having a curved front surface and rear edges that fit within corresponding slots 57 defined by the front sides of the modules 50. The edge protector 55 can be removed to access the fasteners used to secure the modules 50 to the vertical support 53. The back side of the rear housing 39 is preferably open such that the rear adapter modules 50 can be inserted from the back side of the termination block 30 into the bay 48, and pushed into abutment with the vertical support 53.

As shown in FIG. 10, each of the rear adapter modules 50 includes an array of fiber optic adapters 60 arranged in rows and columns. The adapters 60 of the four rear adapter modules 50 collectively form the rear adapter array 342 of the entire termination block 30. The rear adapter array 342 is divided into first and second regions 342a and 342b by a step 344. The step 344 provides an offset that recesses the second region 342b further into the rear housing 39 than the first region 342a. The adapters 60 of each of the regions 342a and 342b are mounted on surfaces aligned at oblique angles relative to the longitudinal axis L of the fiber termination block 30.

Referring to FIG. 8, each of the rear adapter modules 50 includes an array of indicator lights 346 (e.g., light-emitting diodes) for use in tracing cross-connected signals. The indictor lights 346 are located at the front of each module 50, and face toward the front of the termination block 30. Preferably, the indicator lights 346 are laterally offset with respect to the front adapter array 51. Thus, when a technician views the front of the fiber termination block 30, the indicator lights 346 are not obstructed by the front adapter modules 38 of the front adapter array 51. However, when the front adapter modules 38 are slid laterally outward from the guides 45, the adapter modules 38 do at least partially block portions of the array of indicator lights 346 from view.

With the structure thus described, a plurality of fiber optic cables (e.g., cables from equipment) can be coupled to the rear adapter arrays 342. Additional fiber optic cables are routed from the rear adapter array 342 through the rear adapter modules 50 to the front adapter modules 38. In certain embodiments, couplers (e.g., splitters, combiners, wave division multi-plexers, etc.) can be provided within the rear adapter modules 50 for providing a desired cable routing configuration between the rear adapter array 342 and the front adapter array 51. In extending from the rear adapter modules 50 to the front adapter modules 38, the cables pass through an intermediate region defined by the support frame 36 of the fiber termination block 30. The intermediate region includes a plurality of fanning members 350 (shown in FIG. 8) that facilitate cable management within the intermediate region. A side panel 352 encloses the intermediate chamber 348. The side panel 352 includes a plurality of slots 354 that provide clearance for allowing fiber optic cables connected to the front adapter modules 38 to pass through the side panel 352 when the front adapter modules 38 are slid laterally from the guides 45.

Figure 11:
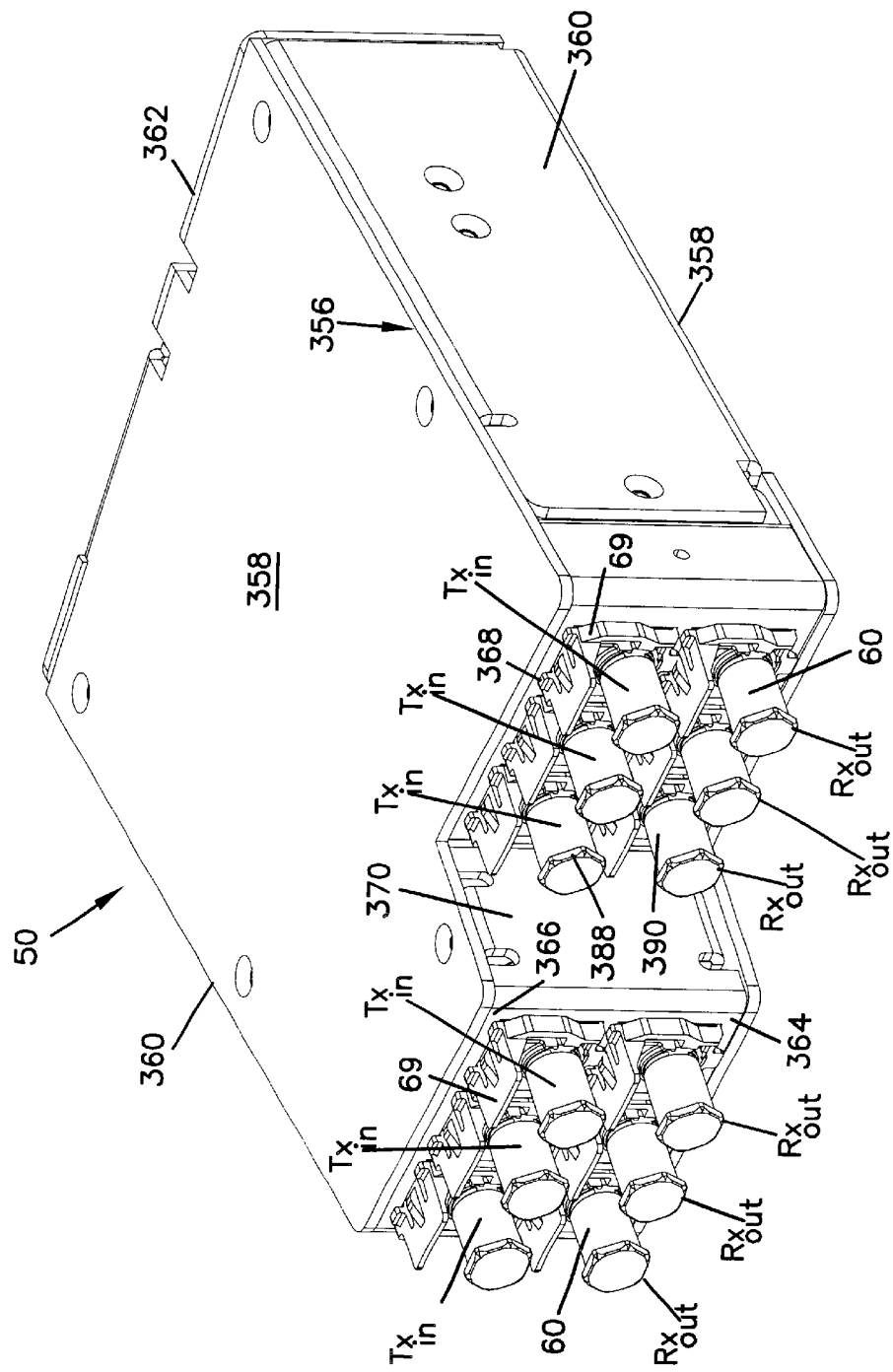
FIG. 11 is a rear perspective view of a rear adapter module constructed in accordance with the principles of the present invention.
Figure 12:
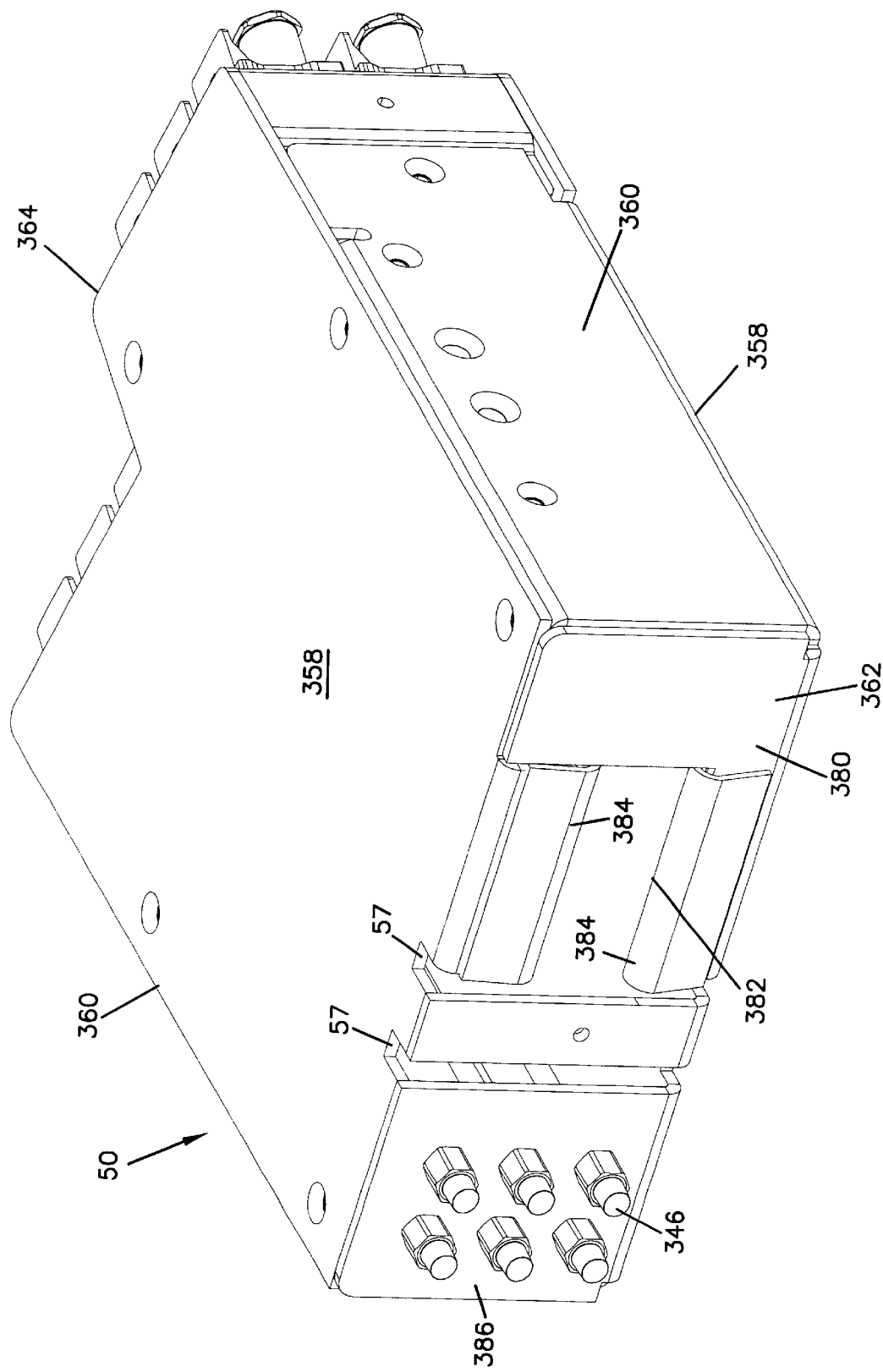
FIG. 12 is a front perspective view of the rear adapter module of FIG. 11.

FIGS. 11 and 12 show one of the rear adapter modules 50 in isolation from the fiber termination block 30. The depicted rear adapter module 50 includes a housing 356 having two spaced-apart major sides 358 interconnected by two spaced-apart minor sides 360. The major and minor sides 358 and 360 extend between front and back ends 362 and 364 of the adapter module 50. The fiber optic adapters 60 are mounted at the back end 364 of the rear adapter module 50. For example, the adapters 60 are shown mounted at first and second surfaces 366 and 368 that are substantially parallel to one another. A staggering member 370 extends transversely between the first and second surfaces 366 and 368 to provide a connection thereinbetween. The adapters 60 are preferably removably connected to the housing 356. For example, the adapters 60 can be snap fit within clips 69 that are snapped within the rear of the housing 356.

Referring to FIG. 12, the rear adapter module 50 also includes a front wall 380 defining an opening 382 sized for allowing a plurality of fiber optic cables to pass therethrough. Radius limiters 384 that limit the amount the fiber optic cables passing through the opening 382 can bend define top and bottom sides of the opening. The front wall 380 also includes a panel portion 386 at which the array of indicator lights 346 is mounted. In certain embodiments, the indicator lights 346 can be eliminated.

As shown in FIG. 11, the depicted embodiment includes 12 adapters. The adapters 60 are arranged in pairs with each pair defining a transmit input port ($Tx_{in}$) and a receive output port ($Rx_{out}$). By way of example, adapters 388 and 390 represent one such pair. Each pair of adapters 60 corresponds to a separate fiber optic circuit. Each of the six circuits has a corresponding indicator light 346 positioned at the front of the rear adapter module 50 for use in tracing cross-connect signals transmitted through the circuits.

Figure 13:
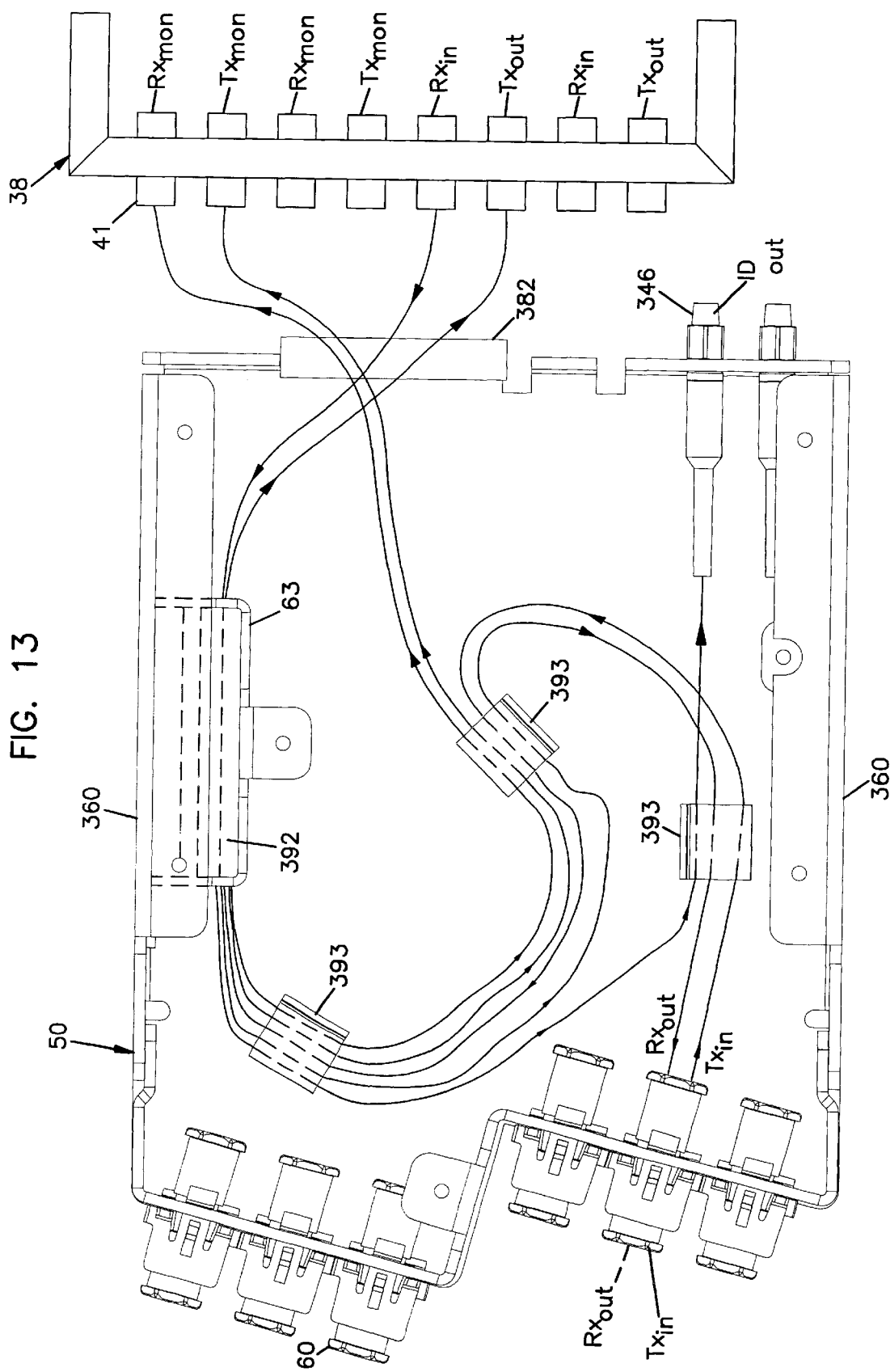
FIG. 13 is a top view of the rear adapter module of FIG. 11 with the side panel removed and a cable management configuration schematic shown therein.

The pairs of rear adapters 60 can be optically coupled to the front adapters 41 by fiber optic cables. Preferably, couplers 392 (shown in FIG. 13) are positioned within the rear adapter module 50 to provide an end user with desired optical routing pathways or configurations. As shown in FIG. 13, the plurality of couplers 392 are mounted within the adapter module 50 by a bracket structure 63 secured to one of the minor sides 360 of the rear adapter module 50.

FIG. 13 shows a strictly representative routing configuration for connecting the $Tx_{in}$ and $Rx_{out}$ ports of one of the pairs of rear adapters 60 to corresponding transmit output and receive input ports ($Tx_{out}$ and $Rx_{in}$) provided at one of the front adapter modules 38. As shown in FIG. 13, the $Rx_{out}$ port is hidden behind the $Tx_{in}$ port. The $Tx_{in}$ signal from the $Tx_{in}$ port is split by one of the couplers 392 such that the signal is also directed to a transmit monitor port $Tx_{monitor}$ at the front adapter module 38, and an indicator light $ID_{out}$ at the front of the rear adapter module 50. The $Rx_{in}$ signal from the $Rx_{in}$ port is split by one of the couplers 392 such that the signal is also directed to a receive monitor port $Rx_{monitor}$ at the front adapter module 38. The fiber optic cables within the rear module 50 are looped around guides 393 within the module 50 to enhance cable management.

While the couplers 392 have been shown as splitters, it will be appreciated that different types of couplers can be varied to achieve desired routing configurations.

Additionally, while only one circuit has been shown in the module 50 for clarity, it will be appreciated that fibers for each of the six different optical circuits can be provided within the rear module 50. Further, in certain embodiments, it may be desired to by-pass the couplers 392 and provide straight pass throughs through the rear module 50. In still other embodiments, the rear adapters 60 can be eliminated, or replaced with blanks, such that the rear module 50 functions solely to house couplers that are accessed through the front opening 382. While six pairs of adapters 60 have been shown mounted on the rear module 50, it will be appreciated that any number of adapters could be used depending upon the needs of an end user.

Figure 14:
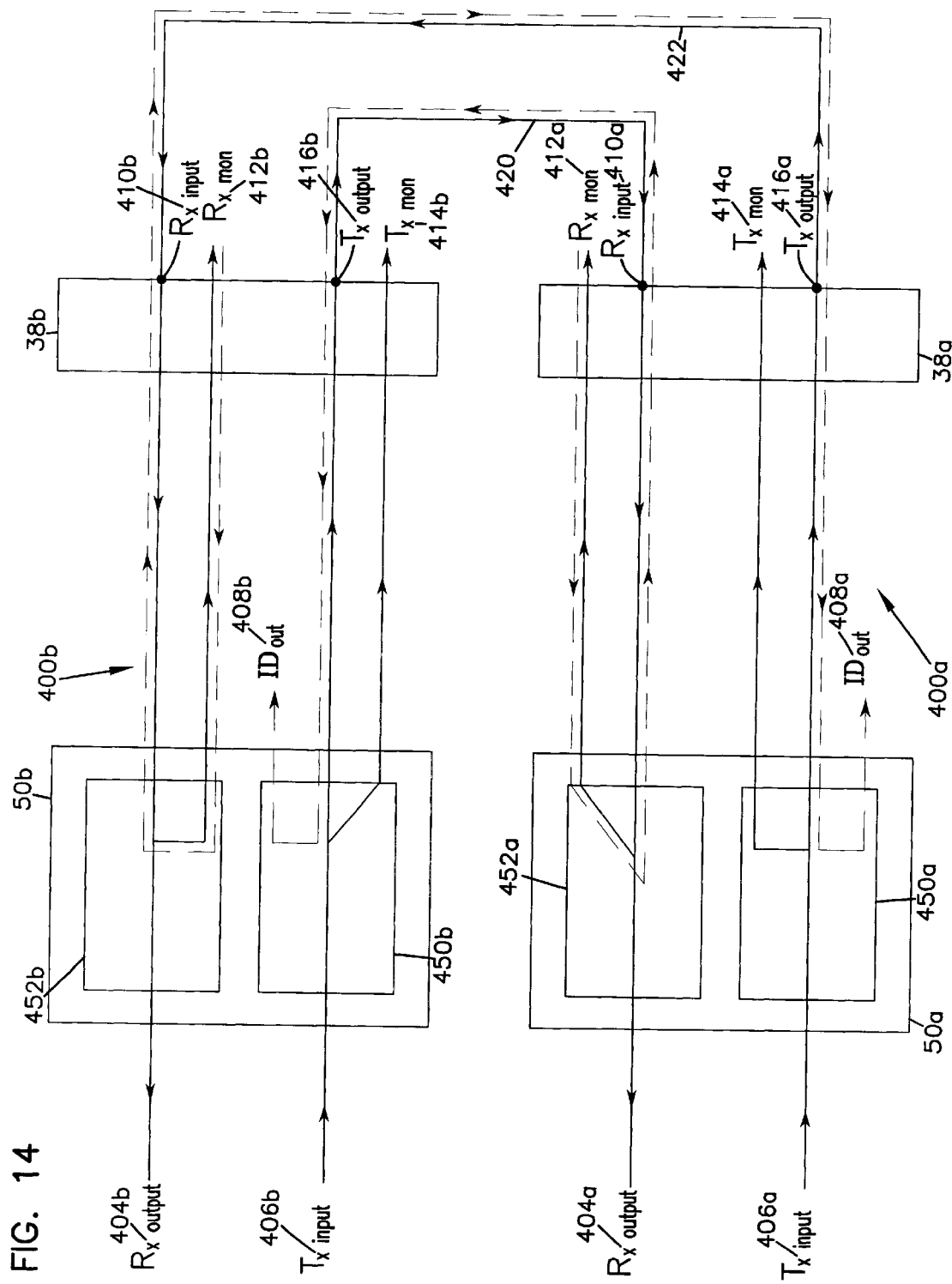
FIG. 14 illustrates a schematic cross-connect circuit configuration showing exemplary signal paths for main signals (solid) and for continuity check and identifier signals (dashed).

An important use of the fiber termination blocks 30 is to provide cross connections between two different fiber optic circuits (e.g., fiber optic circuits from different racks). Generally, in a cross-connect application, the rear adapters 60 are connected to fiber optic equipment to be cross-connected at the front adapters 41 through patch cords. The two circuits each allow optical signal routing, monitoring and signal path identification. FIG. 14 illustrates the circuit paths between a first circuit 400a and a second circuit 400b during main signal usage (shown in solid line), and during visual continuity check and identifier usage (shown in dashed line). Main signals are at the 1310 nanometer (nm) window (e.g., 1260–1360 nm) or the 1550 nm window (e.g., 1430–1580 nm). During visual continuity checking and identification, the identification signals are passed through the circuits in a reverse direction to the main signals. Further, the identification signals are at a wavelength of visible light, such as 400–700 nm.

A rear adapter module 50a and a front connector module 38a form the first circuit 400a; and a rear adapter module 50b and a front connector module 38b form the second circuit 400b. The rear adapter module 50a includes an $Rx_{out}$ port 404a, a $Tx_{in}$ port 406a, and an indicator light 408a. The front connector module 38a includes an $Rx_{in}$ port 410a, an $Rx_{mon}$ 412a, a $Tx_{mon}$ port 414a and a $Tx_{out}$ port 116a. The rear module 50b includes an $Rx_{out}$ port 404b, a $Tx_{in}$ port 406b, and an indicator light 408b. The front connector module 38b includes an $Rx_{in}$ port 410b, an $Rx_{mon}$ port 412b, a $Tx_{mon}$ port 414b and a $Tx_{out}$ port 416b. A first cross connect cable 420 (e.g., a patch cord or a jumper cable) provides a connection between the $Rx_{in}$ port 410a and the $Tx_{out}$ port 416b. Also, a second cross connect cable 422 provides a fiber optic connection between the $Tx_{out}$ port 416a and the $Rx_{in}$ port 410b.

A main signal inputted (e.g., from equipment) at the $Tx_{in}$ port 406a travels through the module 50a to the $Tx_{out}$ port 416a of the front connector module 38a. From the $Tx_{out}$ port 416a, the signal travels through cross connect cable 422 to the $Rx_{in}$ port 410b of the front connector module 38b. Thereafter, the signal travels from the $Rx_{in}$ port 410b to the $Rx_{out}$ port 404b where the signal is outputted to equipment.

To trace the main signal described above, a tracing signal can be injected through the $Rx_{mon}$ port 412b. The injected signal follows the pathway defined by the main signal through the cross connect cable 422 to the first module 50a where the tracing signal is output at the indicator light 408a.

The second main signal is input at $Tx_{in}$ port 406b (e.g., from equipment) and is transmitted to the $Tx_{out}$ port 416b of the front connector module 38b. From the $Tx_{out}$ port 416b, the signal is transmitted by the cross connect cable 420 to the $Rx_{in}$ port 410a of the front connector module 38a. From the front connector module 38a, the signal travels to the $Rx_{out}$ port 404a where the signal is outputted to equipment.

To trace the second main signal, a tracing signal can be injected into the $Rx_{mon}$ port 412a. The injected signal travels in a reverse direction along the pathway defined by the second main signal and is output at the indicator light 408b of the second module 50b.

As described above, the tracing signals are injected through the monitor ports. Alternatively, separate ports can be linked to the receive output lines (e.g., by couplers such as splitters) for use in injecting tracing signals through the cross-connect circuits. Also, couplers 450a and 452a are used to split signals at the first module 50a, and couplers 450b and 452b are used to split signals at the second module 50b. It will be appreciated that the couplers 450a, 452a, 450b and 452b can have any number of conventionally known configurations, and are preferably adapted to allow the identification signals to pass in the reverse direction to the main signals. Also, the adapters described herein can have any number of known adapter configurations (e.g. FC type adapters, SC type adapters, ST type adapters, etc.)

With regard to the foregoing description, it is to be understood that changes can be made in detail, especially in matters of the construction materials employed and the shape, size and arrangement of the parts without departing from the scope of the present invention. It is intended that the specification and the depicted aspects be considered exemplary only, with a true scope and spirit of the invention being indicated by the broad meaning of the following claims.

We claim:

1. A fiber termination block comprising:
   a frame structure adapted to be connected to a fiber distribution rack, the frame structure including a front end and a rear end and a longitudinal axis that extends between the front and rear ends;
   a plurality of sliding adapter packs positioned adjacent the front end of the frame structure, each of the adapter packs including a row of front fiber optic adapters, the rows of fiber optic adapters being arranged in a forwardly facing array, the sliding adapter packs being slidable in a direction transverse with respect to the longitudinal axis of the frame structure to facilitate accessing the adapter packs;
   a plurality of rear modules mounted at the rear end of the frame structure, the rear modules including a plurality of rear fiber optic adapters arranged in a rearwardly facing array;
   a plurality of fiber optic cables for transmitting fiber optic signals between the front fiber optic adapters and the rear fiber optic adapters; and
   at least one coupler mounted within each of the rear modules through which at least some of the signals carried by the fiber optic cables are routed.

2. The fiber termination block of claim 1, wherein the rear modules each include at least one rear wall positioned opposite from a front wall, wherein the rear fiber optic adapters are mounted at the rear walls, and wherein the front walls each define an opening through which the fibers pass to extend from the rear modules to the sliding adapter packs.

3. The fiber termination block of claim 2, further comprising a plurality of indicator lights positioned at the front walls of the rear modules and linked to at least some of the fiber optic cables.

4. The fiber termination block of claim 3, wherein the indicator lights are laterally offset from the forwardly facing array defined by the forward adapters, and wherein the lateral offset permits the indicator lights to be viewed directly from the front end of the frame structure without interference from the forward adapters.

5. The fiber termination block of claim 2, further comprising radius limiters for guiding the fiber optic cables through the openings in the front walls.

6. A fiber termination block comprising:
a frame structure adapted to be connected to a fiber distribution rack, the frame structure including a front end and a rear end;
a front fiber optic adapter array positioned adjacent the front end of the frame structure;
a plurality of rear modules mounted at the rear end of the frame structure, each of the rear modules defining a front opening;
at least one coupler mounted within each of the rear modules; and
a plurality of fiber optic cables for transmitting fiber optic signals between the front fiber optic adapter array and the couplers, the fiber optic cables extending through the front openings of the rear modules to access the couplers.

7. The fiber termination block of claim 6, wherein the rear modules each include a plurality of rear fiber optic adapters arranged in a rearwardly facing array, the rear fiber optic adapters being coupled to at least some of the fiber optic cables.

8. The fiber termination block of claim 7, further comprising a plurality of indicator lights positioned at a front end of each rear module for tracing cross connect signals.

9. The fiber termination block of claim 8, wherein one of the rear fiber optic adapters is optically coupled to a transmit output port and a transmit monitor port of the front fiber optic adapter array and is also optically coupled to one of the indicator lights; and another of the rear fiber optic adapters is optically coupled to a receive input port and a receive monitor port of the front fiber optic adapter array.

10. The fiber termination block of claim 6, further comprising a plurality of cable management guides positioned within the rear modules.

11. The fiber termination block of claim 6, further comprising radius limiters positioned at the front openings of the rear modules for limiting the bending radiuses of the fiber optic cables passing through the front openings.

12. A fiber optic module adapted to be connected to a fiber optic distribution frame, the fiber optic module comprising;
a housing including two spaced-apart major sides interconnected by two spaced-apart minor sides, the major and minor sides extending between front and rear ends of the housing, the front end of the housing defining a front opening sized for allowing a plurality of fiber optic cables to pass therethrough;
structure for connecting the housing to the distribution frame;
a plurality of fiber optic adapters mounted at the rear end of the housing;
a plurality of indicator lights mounted at the front end of the housing;
a fiber optic coupler mounted within the housing; and
at least one radius limiter positioned near the front opening of the housing for limiting the bending radiuses of the fiber optic cables that pass through the opening.

13. The fiber optic module of claim 12, wherein the coupler is secured to one of the minor sides of the housing.

14. The fiber optic module of claim 12, further comprising cable management guides mounted within the housing.

15. A fiber distribution apparatus comprising:
a rack having a front side and a rear side;
a front fiber optic adapter array positioned adjacent the front side of the rack;
a plurality of rear modules mounted at the rear side of the rack, each of the rear modules defining a front opening;
at least one coupler mounted within each of the rear modules; and
a plurality of fiber optic cables for transmitting fiber optic signals between the front fiber optic adapter array and the couplers, the fiber optic cables extending through the front openings of the rear modules to access the couplers.

16. The fiber distribution apparatus of claim 15, wherein the rear modules each include a plurality of rear fiber optic adapters arranged in a rearwardly facing array, the rear fiber optic adapters being coupled to at least some of the fiber optic cables.

17. The fiber distribution apparatus of claim 16, further comprising a plurality of indicator lights positioned at a front end of each rear module for tracing cross connect signals.

18. The fiber distribution apparatus of claim 15, further comprising radius limiters positioned at the front openings of the rear modules for limiting the bending radiuses of the fiber optic cables passing through the front openings.

19. The fiber distribution apparatus of claim 15, further comprising a plurality of cable management guides positioned within the rear modules.

20. The fiber distribution apparatus of claim 15, wherein the rack includes centrally located, vertical cable management troughs located at both the front side and the rear side of the rack, and wherein each of the troughs includes cable management spools.

21. The fiber distribution apparatus of claim 20, wherein at both the front side and the rear side the rack includes two vertical cable management channels positioned on opposite sides of the centrally located vertical troughs.

22. The fiber distribution apparatus of claim 21, wherein the vertical channels are defined by a plurality of vertically spaced-apart rings.

23. The fiber distribution apparatus of claim 22, wherein the rear side of the rack includes a plurality of vertically spaced-apart horizontal troughs, each of the troughs including a radius limiter member that connects with one of the rings.

* * * * *